United States Patent [19]
Lampert et al.

[11] Patent Number: 6,074,973
[45] Date of Patent: Jun. 13, 2000

[54] CATALYZED HYDROCARBON TRAP MATERIAL AND METHOD OF MAKING THE SAME

[75] Inventors: Jordan K. Lampert, Metuchen; Michel Deeba, North Brunswick; Robert J. Farrauto, Westfield, all of N.J.

[73] Assignee: Engelhard Corporation, Iselin, N.J.

[21] Appl. No.: 09/045,582

[22] Filed: Mar. 20, 1998

[51] Int. Cl.[7] .................................................. B01J 29/04
[52] U.S. Cl. .............................. 502/60; 502/64; 502/66; 502/67; 502/71; 502/74; 502/77; 502/79; 502/330; 502/339; 502/347; 423/239.2; 423/213.2; 95/902
[58] Field of Search .................................. 502/60, 64, 74, 502/330, 339, 347, 66, 67, 71, 77, 79; 95/902, 237; 423/212, 213.2, 239.2

[56] References Cited

U.S. PATENT DOCUMENTS

| | | | |
|---|---|---|---|
| 3,331,190 | 7/1967 | Glew et al. | 55/63 |
| 4,134,860 | 1/1979 | Hindin et al. | 252/466 |
| 4,171,288 | 10/1979 | Keith et al. | 252/462 |
| 4,171,289 | 10/1979 | Wheelock | 252/466 |
| 4,529,828 | 7/1985 | Antos et al. | 585/828 |
| 4,683,214 | 7/1987 | Angevine et al. | 502/66 |
| 4,714,694 | 12/1987 | Wan et al. | 502/304 |
| 4,727,052 | 2/1988 | Wan et al. | 502/327 |

(List continued on next page.)

FOREIGN PATENT DOCUMENTS

| | | | |
|---|---|---|---|
| 0 485 179 A2 | 5/1992 | European Pat. Off. | |
| 0 491 360 A1 | 6/1992 | European Pat. Off. | |
| 0 499 931 A1 | 8/1992 | European Pat. Off. | |
| 0 503 500 A1 | 9/1992 | European Pat. Off. | |
| 0 508 513 A1 | 10/1992 | European Pat. Off. | |
| 0 667 182 A2 | 8/1995 | European Pat. Off. | B01D 53/86 |
| 0 691 459 A1 | 1/1996 | European Pat. Off. | |
| 0 755 714 A2 | 1/1997 | European Pat. Off. | B01D 53/75 |

(List continued on next page.)

OTHER PUBLICATIONS

Patent Abstracts of Japan, vol. 095, No. 009, Oct. 31, 1995; JP 07 155613 A (Nissan Motor Co. Ltd.).

J.S. Feeley et al, "Abatement of NOx from Diesel Engines: Status and Technical Challenges", SAE Technical Paper Series, No. 950747, Feb. 1995.

B.H. Engler et al, "Reduction of Exhaust Gas Emissions by Using Hydrocarbon Adsorber Systems", SAE Technical Paper Series, No. 930738, Mar. 1993.

S. Kagawa et al, "Cocation Effect in Catalytic Property of Copper Ion–Exchanged ZSM–5 Zeolites for the Direct Decomposition of Nitrogen Monoxide", Chemistry Letters, pp. 407–410, 1991.

D.W. Breck, "Zeolite Molecular Sieves, Structure, Chemistry and Use", J. Wiley & Sons, New York, 1974, pp. 305, 309 and 348.

(List continued on next page.)

*Primary Examiner*—Tom Dunn
*Assistant Examiner*—Cam N. Nguyen
*Attorney, Agent, or Firm*—Richard A. Negin

[57] ABSTRACT

A catalyzed hydrocarbon trap material washcoat (20) used in a trap (10), which may be placed downstream of a conventional catalyst member (28), is useful for treating internal combustion engine (22) exhaust. Trap (10) traps hydrocarbons during cold operation periods and releases them for oxidation during higher-temperature operating periods. The material comprises palladium and silver dispersed on a high surface area metal oxide support and a zeolite material such as one or more of ZSM-5, Beta, Y, and other suitable zeolites. The trap material is efficiently made by combining in a single vessel the zeolite, the metal oxide support, and aqueous solutions of a palladium compound and a silver compound. Surprisingly, the intimate combination of silver with the palladium does not adversely affect catalytic efficiency of the palladium and provides advantageous results in enhancing catalytic oxidation of hydrocarbons desorbed from the trap (10) and coke which forms thereon.

18 Claims, 3 Drawing Sheets

U.S. PATENT DOCUMENTS

| | | |
|---|---|---|
| 4,929,581 | 5/1990 | Steinwandel et al. ............... 502/2 |
| 4,934,142 | 6/1990 | Hayashi et al. ............... 60/297 |
| 4,944,273 | 7/1990 | Baresel et al. ............... 123/440 |
| 5,017,538 | 5/1991 | Takeshima ............... 502/64 |
| 5,125,231 | 6/1992 | Patil et al. ............... 60/274 |
| 5,157,007 | 10/1992 | Domesle et al. ............... 502/66 |
| 5,164,350 | 11/1992 | Abe et al. ............... 502/66 |
| 5,206,196 | 4/1993 | Nakano et al. ............... 502/73 |
| 5,234,876 | 8/1993 | Swaroop et al. ............... 502/79 |
| 5,236,879 | 8/1993 | Inoue et al. ............... 502/73 |
| 5,244,852 | 9/1993 | Lachman et al. ............... 502/66 |
| 5,248,643 | 9/1993 | Patil et al. ............... 502/67 |
| 5,284,638 | 2/1994 | Hertl et al. ............... 423/245.1 |
| 5,292,991 | 3/1994 | Lachman et al. ............... 585/850 |
| 5,365,011 | 11/1994 | Ramachandran et al. ............... 585/829 |
| 5,504,052 | 4/1996 | Rizkalla et al. ............... 502/347 |
| 5,538,697 | 7/1996 | Abe et al. ............... 422/171 |
| 5,538,698 | 7/1996 | Abe et al. ............... 422/174 |
| 5,589,432 | 12/1996 | Yoshida et al. ............... 502/325 |
| 5,602,070 | 2/1997 | Rizkalla ............... 502/347 |
| 5,723,403 | 3/1998 | Durand et al. ............... 502/304 |
| 5,741,468 | 4/1998 | Saito et al. ............... 423/239.1 |
| 5,747,410 | 5/1998 | Muramatsu et al. ............... 502/348 |
| 5,772,972 | 6/1998 | Hepburn et al. ............... 423/213.5 |
| 5,780,002 | 7/1998 | Miyadera et al. ............... 423/239.1 |
| 5,792,436 | 8/1998 | Feeley et al. ............... 423/210 |
| 5,807,528 | 9/1998 | Nakano et al. ............... 423/213.2 |
| 5,879,645 | 3/1999 | Park et al. ............... 423/213.2 |
| 5,882,607 | 3/1999 | Miyadera et al. ............... 422/177 |

FOREIGN PATENT DOCUMENTS

| | | |
|---|---|---|
| 0 782 880 A1 | 7/1997 | European Pat. Off. ........ B01D 53/94 |
| 1 467 174 | 1/1973 | Germany . |
| 38 05 734 A1 | 8/1989 | Germany . |
| 42 26 111 A1 | 2/1994 | Germany . |
| 42 26 112 A1 | 2/1994 | Germany . |
| 56-2920 | 1/1981 | Japan . |
| 56-5419 | 1/1981 | Japan . |
| 60-147240 | 8/1985 | Japan . |
| 1-139144 | 5/1989 | Japan . |
| 1-155611 | 6/1989 | Japan . |
| 2-126936 | 5/1990 | Japan . |
| 2-251247 | 10/1990 | Japan . |
| 5-317701 | 12/1993 | Japan . |
| 6-126165 | 5/1994 | Japan . |
| 6-210163 | 8/1994 | Japan . |
| 6-210164 | 8/1994 | Japan . |
| 6-312132 | 11/1994 | Japan . |
| 7-102957 | 4/1995 | Japan . |
| 7-88364 | 4/1995 | Japan . |
| 7-96178 | 4/1995 | Japan . |
| 7-155613 | 6/1995 | Japan . |
| 7-185326 | 7/1995 | Japan . |
| 8-10566 | 1/1996 | Japan . |
| 8-10613 | 1/1996 | Japan . |
| 8-99033 | 4/1996 | Japan . |
| 1060424 | 3/1967 | United Kingdom . |
| 1071373 | 6/1967 | United Kingdom . |
| 1551348 | 12/1976 | United Kingdom . |
| 2 259 461 | 3/1993 | United Kingdom ............... F01N 3/28 |
| WO 94/01926 | 1/1994 | WIPO . |
| WO 94/22564 | 10/1994 | WIPO . |
| WO 96/15992 | 5/1996 | WIPO . |
| WO 96/39576 | 12/1996 | WIPO . |
| WO 96/40419 | 12/1996 | WIPO . |
| WO 97/00119 | 1/1997 | WIPO . |

OTHER PUBLICATIONS

P.A. Jacobs and J.A. Martens, "Synthesis of High–Silica Aluminosilicate Zeolites", Studies in Surface Science and Catalysis, vol. 33, Ed. B. Delmon and J.T. Yates, Elsevier, Armsterdam–Oxford–New York–Tokyo, 1987, Table of Contents pp. V–IX.

M. Iwamoto, "Decomposition of Nitrogen Oxides by Contact Reaction", Petrotech 12(11), pp. 888–892, (1989).

M. Iwamoto, "NOx Reduction Characteristics of PT–ZSM–5 Catalyst With Diesel Engine Exhaust", JSAE (Japan) Review, 16, pp. 21–25, (1995).

Burch et al, "An Investigation of the Mechanism of the Selective Catalytic Reduction of NO on Various Metal/ZSM–5 Catalysts: Reaction of H2/NO Mixtures"; Catalysis Letters 27 (1994), pp. 177–186.

CATALYZED HYDROCARBON TRAP MATERIAL AND METHOD OF MAKING THE SAME

BACKGROUND OF THE INVENTION

1. Field of the Invention

The present invention relates to a catalyzed hydrocarbon trap material and a method of making the same. More particularly, the invention relates to such material comprising a palladium component dispersed on a refractory inorganic oxide support such as alumina, and a zeolite having temperature-responsive hydrocarbon-adsorbing and desorbing properties, and having a silver component dispersed thereon to enhance the hydrocarbon-adsorbing properties.

2. Related Art

The treatment of internal combustion engine exhaust to convert noxious components such as hydrocarbons ("HC"), carbon monoxide ("CO") and nitrogen oxide ("$NO_x$") to innocuous components (water, carbon dioxide and nitrogen) is, of course, well known in the art. Such conversion is attained by contacting the engine exhaust with one or more catalysts, usually comprising an oxidation catalyst and a reduction catalyst, or a so-called three-way conversion catalyst, which has the capability of substantially simultaneously oxidizing HC and CO to water and carbon dioxide, and reducing $NO_x$ to nitrogen. Such catalysts often comprise a platinum group metal such as platinum, platinum plus rhodium or palladium dispersed on a refractory inorganic oxide support such as gamma alumina. It is also known to utilize zeolite particles, including zeolite particles which have been ion-exchanged with metal cations, as a hydrocarbon trap material.

A persistent problem in meeting ever more stringent government regulations concerning the discharge of pollutants from engine exhaust is the fact that catalysts, especially oxidation catalysts, require an elevated temperature, usually above 200 or 250° C., in order to attain reasonably high conversion efficiencies. Therefore, during an initial start or other period of engine operation while the engine is cold, referred to as a "cold operation period", conversion of pollutants, especially hydrocarbons, is carried out with a low efficiency, if at all. Thus, a very substantial proportion of the total oxidizable pollutants, largely comprising hydrocarbons, discharged to the atmosphere during a given period of operation, is discharged during the cold operation period. In order to ameliorate this problem, the art is aware of the expedient of using, in conjunction with the catalyst, a hydrocarbon trap material, such as certain zeolites, which will adsorb hydrocarbons at a low temperature at which the oxidation catalyst is relatively ineffective, and desorb the hydrocarbons only at a more elevated temperature, at which conversion efficiency of the oxidation catalyst is higher than during the cold operation period.

One difficulty with such prior art expedients is that such zeolite materials tend to begin desorbing hydrocarbon, and thus releasing it to the catalyst, before the catalyst is hot enough to attain acceptably high conversion efficiencies. That is, the prior art inclusion of zeolites, while improving the situation by adsorbing hydrocarbons for a period, commence the desorption too soon after the cold operation period, thereby releasing the hydrocarbons before the catalyst is sufficiently heated, so that only a limited benefit is attained. It would therefore be desirable to have a composition which adsorbs or otherwise traps and retains the hydrocarbons and does not release them until release temperatures higher than those heretofore attainable are reached by the catalyst used to oxidize the hydrocarbons.

U.S. Pat. No. 4,683,214, issued on Jul. 28, 1987 to P. J. Angevine et al ("the '214 Patent"), discloses crystallizing a zeolite from a forming mixture containing an organic template, treating the zeolite to remove the template, and blending the zeolite with a binder, for example, an inorganic oxide such as alumina, and a solution containing noble metal. The blended mixture can then be extruded to form the desired type of catalyst particle (column 2, lines 28–39). At column 2, line 48 et seq, the catalysts of the '214 Patent are said to be useful in any process or combination of processes which employ metal catalyst components such as platinum or palladium, as well as other noble metals. Processes such as hydrogenation, isomerization, reforming and others, are mentioned; at column 10, lines 63–66, the catalysts are also stated to be advantageously employed under oxidation reaction conditions as oxidation or combustion catalysts, for example, in processes such as methanol synthesis, Fischer-Tropsch process, etc.

At column 3, lines 28–33, the '214 Patent states that the noble metals include platinum, palladium and silver, among numerous others, and that, in addition, any suitable hydrogenation component, e.g., a group VIII metal, may be incorporated within a zeolite. There is no specific disclosure of combining two or more of the metals. At column 8, line 53, to column 9, line 9, the '214 Patent states that contacting a mixture of zeolite and inorganic oxide binder such as alumina with an anionic noble metal-containing species would be expected to result in noble metal loading of the binder rather than the zeolite, owing to exchange of the platinum anion with residual hydroxyl anions of the binder. The use of noble metals in both cationic and anionic form is disclosed, for example, in, respectively, claims 24 and 26 of the '214 Patent.

Another difficulty with prior art expedients in which the zeolites are ion-exchanged with cations such as silver, copper or other metals, is the perceived need to segregate catalytic components, such as platinum group metals dispersed on an inorganic oxide support material, from metal ions such as silver, which are ion-exchanged or otherwise dispersed on the zeolite particles. This requires additional manufacturing steps and segregated operations in which impregnation of the oxide supports with catalytic metals such as platinum, or platinum and rhodium, is segregated from operations in which metal cations are ion-exchanged into the zeolites. The ion-exchanged zeolite particles and the separately prepared platinum group metal-impregnated support material particles are then admixed with each other, or disposed on separate portions of a substrate, in order to provide the finished hydrocarbon trap/catalyst material.

U.S. Pat. No. 5,244,852, issued on Sep. 14, 1993 to I. M. Lachman et al ("the '852 Patent") discloses in Example I thereof combining a molecular sieve such as silicate zeolite with pseudoboehmite, a form of alumina (column 6, lines 20–48), making a slurry of the mixture, coating the slurry onto a honeycomb substrate and firing the coated substrate at a temperature of 500 to 600° C. The fired substrate is then loaded with noble metal, e.g., platinum, by impregnation with a solution of noble metal to provide a three-way conversion catalyst for oxidizing HC and CO and reducing $NO_x$ in automotive engine emissions control. Subsequent examples show the use of silicalite, zeolite and ultra-stable Y-zeolite in combination with the pseudoboehmite, and silicalite zeolite in combination with alumina. In Example VI at column 8 of the '852 Patent, palladium is used as the noble metal impregnated into the silicalite zeolite-alumina washcoat. Other examples show the use of platinum or a combination of platinum and palladium impregnated into the washcoat. Still other examples show the use of mordenite zeolite with dispersible pseudoboehmite. The '852 Patent teaches that by utilizing zeolites plus a binder, such as an alumina binder, rhodium may be replaced by palladium and/or platinum in the catalyst system. Any one of the many zeolites disclosed at column 2, line 13 et seq of the '852 Patent, including ZSM-5 and Beta zeolite, is stated to be usable. Preferably, the zeolites and an alumina binder, such as gamma alumina or a precursor thereof, such as pseudoboehmite alumina, is utilized. At column 2, lines 51–59, the '852 Patent states that, "Interestingly, and fortuitously, the noble metal precursors do not substantially site on the already present zeolite. This advantageous result provides a segregated system, . . . " That is, a system wherein (column 2, line 58 et seq) the noble metals are dispersed only on metal oxide particles and the oxide and molecular sieve particles are juxtaposed to each other, and therefore each is able to catalyze the appropriate reactions. This segregated aspect, in which the noble metal (e.g., platinum or palladium) is sited only on the high surface area oxide (e.g., alumina) is reflected in the claims. For example, claim 1 of the composition claims of the '852 Patent requires that "substantially all of the noble metal is sited on the high surface area oxide . . . " The method claims of related U.S. Pat. No. 5,292,991, like the composition claims of the '852 Patent, call for the zeolite to be selected from the group consisting of ZSM zeolite and silicalite, and to be impregnated with a noble metal selected from the group consisting of platinum and palladium, and that the washcoat is characterized in that "substantially all of the noble metal is sited on the high surface area oxide . . . "U.S. Pat. No. 5,292,991, issued Mar. 8, 1994 to I. M. Lachman et al, is related to the '852 Patent as having issued on a divisional of the application which resulted in the '852 Patent.

NGK Insulators' Japanese patent document (Kokai) 8-10566 (1996) was published on Jan. 16, 1996 based on Japanese Patent Application 6-153650, filed on Jul. 5, 1994 and entitled "A Catalyst-Adsorbent For Purification Of Exhaust Gases And An Exhaust Gas Purification Method." The Abstract of this document, below referred to as "the '650 Application", discloses a catalyst-adsorbent in which a catalyst material effective for decreasing CO, HC and $NO_x$ in internal combustion engine exhaust is combined with an adsorbent material that traps hydrocarbon during cold discharge start-ups. The catalyst material may be one or more of platinum, palladium and rhodium, preferably palladium, carried on a heat-resistant inorganic oxide, e.g., activated alumina, and containing at least 2 to 30 weight percent palladium. The catalyst-adsorbent is carried onto a monolithic honeycomb and the proportion of catalyst material to adsorbent material is given as 15 to 90% catalyst and 10 to 85% adsorbent material, by weight.

In a preferred embodiment of the '650 Application, palladium in a concentration of 2 to 30 weight percent is carried on a refractory inorganic oxide which may comprise activated alumina, zirconia, silica or titania. The composition may also include rare earth oxides, except that when rhodium is employed, the addition of ceria is to be avoided.

The adsorbent material of the '650 Application is comprised of particles of primarily zeolite, preferably zeolite having a silica-to-alumina ratio of 40 or more; these include ZSM-5 and Beta zeolites. The zeolite adsorbent may optionally have metal ions dispersed therein, the presence of ions of high electro-negativity being said to increase the HC adsorptive capacity. Such ions include silver, palladium, platinum, gold, nickel, copper, zinc, cobalt, iron, manganese, vanadium, titanium, and aluminum. The '650 Application discloses that metal cations may be applied to the zeolite by either ion exchange or immersion methods. The presence in the zeolite of at least one ion of elements of Group IB of the Periodic Table (copper, silver, gold) is said in the '650 Application to manifest a high adsorptive capacity for hydrocarbons even in the presence of water. Copper and silver are stated to be preferable and silver ions, which are specified in some of the examples of the '650 Application, exchanged into the zeolite are said to be particularly desirable for adsorbing HC at higher temperatures. It is stated that the ion content of the zeolite should be greater than 20%, and preferably greater than 40%, relative to the aluminum atoms in the zeolite. Example 95 of the '650 Application shows palladium on ceria-stabilized alumina in a first coating layer and silver- and copper-exchanged ZSM-5 in a second coating layer. Table 6 shows ZSM-5 zeolites exchanged only with silver. The '650 Application discloses that in order to improve low-temperature ignition characteristics to the maximum, it is desirable to form a palladium surface coat layer in which palladium is the only noble metal carried on the particles. The '650 Application further discloses the desirability of forming a first coating on a substrate comprised of the adsorbent zeolite material, over which a second coating comprised of a catalyst material containing only palladium catalyst particles is placed. This is stated to provide excellent durability and low-temperature ignition characteristics of the catalyzed trap material.

In preparing the materials of the '650 Application, alumina powder, sometimes stabilized against thermal degradation in the known manner by impregnation with ceria, is coated with either palladium, platinum or rhodium. The zeolite materials of the '650 Application, optionally having metal ions dispersed therein, are prepared separately from the platinum group metal catalytic materials and the separately prepared powders are then applied to substrates to form the desired compositions.

SUMMARY OF THE INVENTION

In accordance with the present invention there is provided a catalyzed hydrocarbon trap material in which silver and palladium are both dispersed onto zeolite particles and onto refractory metal oxide particles. In one embodiment of the invention, the major portion of the silver is dispersed onto the zeolite particles and the major portion of the palladium is dispersed onto the refractory metal oxide particles, with only a minor portion of the silver dispersed onto the metal oxide particles and only a minor portion of the palladium dispersed onto the zeolite particles. The catalyzed hydrocarbon trap material of the invention is made by a method in which the refractory metal oxide particles and the zeolite particles, together with a soluble palladium component and a soluble silver component dispersed or dissolved together in water, are all combined to effectuate the impregnation of the palladium and silver components into the zeolite and metal oxide particles. The resulting slurry may then be deposited on a suitable substrate, such as a honeycomb-type substrate, and fired at an elevated temperature to provide the catalyzed hydrocarbon trap material.

Specifically, in accordance with the present invention there is provided a method of making a catalyzed hydrocarbon trap material comprising the following steps. Water, a water-soluble silver component, a water-soluble palladium component, particulate refractory inorganic oxide solids, and particulate zeolite solids having a Si to Al atomic ratio of at least 10 and a pore aperture diameter of at least 4 Angstroms are combined to form an aqueous slurry of the solids. The zeolites may comprise one or more of ZSM-5, Beta, Y, MCM-22 and EU-1 zeolites, e.g., one or more of ZSM-5, Beta and Y zeolites. In one aspect, the zeolite comprises ZSM-5 and, optionally, at least one zeolite selected from the group consisting of Beta, Y, MCM-22 and EU-1 zeolites. In any case, the resulting slurry is maintained for a time sufficient to disperse at least some of the palladium component and at least some of the silver component onto each of the inorganic oxide solids and the zeolite solids. Optionally, the loading of the palladium component may be greater on the inorganic oxide solids than on the zeolite solids, and the loading of the silver component may be greater on the zeolite solids than on the organic oxide solids. The slurry is then dewatered to provide dewatered solids, and the dewatered solids are heated, e.g., in air at a temperature of at least about 500° C. for at least the time required to decompose the counter ions, i.e., the anions such as nitrate or acetate ions, of the metal salts used in the preparation, and to provide the catalyzed hydrocarbon trap material as a dried mixture of solids.

The following aspects of the invention may be present alone or in any combination of two or more thereof: the loading of palladium on the inorganic oxide solids may be from about 2 to 20 weight percent and the loading of the silver on the zeolite solids may be from about 2 to 15 weight percent; the loading of palladium on the zeolite solids may be from about 0.05 to 5 weight percent and the loading of silver on the inorganic oxide solids may be from about 0.05 to 10 weight percent; the method may include comminuting the solids to an average particle size of about 2 to 15 microns with a size distribution such that at least ninety percent of the particles have a diameter of not more than about 15 microns; and the step of dewatering the slurry may comprise contacting the aqueous slurry with a substrate to deposit the solids as a coating onto the substrate, and then heating the resulting coated substrate; and the weight ratio (dry basis) of inorganic metal oxide solids to zeolite solids on a metals-free basis may be from about 5:1 to 1:5.

A composition aspect of the invention provides a catalyzed hydrocarbon trap material comprising a mixture of (1) a particulate refractory inorganic oxide support having dispersed thereon a silver component and a catalytically effective amount of a palladium component, and (2) a particulate zeolite other than Y zeolite having a Si to Al atomic ratio of at least 10, e.g., from about 10 to 300, preferably 10 to 150, and a pore aperture diameter of at least 4 Angstroms, e.g., from about 4 to 8 Angstroms. When the zeolite is Y zeolite, it has the pore aperture diameter as described above but a Si to Al atomic ratio of from about 10 to 20 or somewhat higher. The zeolite has dispersed thereon a silver component and a palladium component. The loading of the silver component on the zeolite optionally may be greater than the loading of the palladium component on the zeolite, and the loading of the palladium component on the oxide support optionally may be greater than the loading of the silver component on the oxide support. The catalyzed hydrocarbon trap material is made by a process comprising the following steps. Water, a water-soluble silver component, a water-soluble palladium component, particulate refractory inorganic oxide solids, and particulate zeolite solids are combined to form an aqueous slurry of the solids. The resulting slurry is maintained for a time sufficient to disperse at least some of the palladium component and at least some of the silver component onto each of the inorganic oxide solids and the zeolite solids. The slurry is then dewatered to provide dewatered solids and the dewatered solids are heated to provide the catalyzed hydrocarbon trap material as a dried mixture of solids.

The materials of the composition may be those described above with respect to the method of making the catalyzed hydrocarbon trap material.

Yet another aspect of the present invention provides for a method of treating an oxygen-containing exhaust of a combustion process, e.g., the exhaust of an internal combustion engine, to convert at least hydrocarbon pollutants contained therein by oxidation of hydrocarbons to carbon dioxide and $H_2O$. The method comprises the steps of contacting the exhaust in series with (1) a treatment catalyst effective to catalyze the oxidation of at least hydrocarbons under oxidizing conditions, and (2) the catalyzed hydrocarbon trap material described above. The method includes carrying out such contacting during a cold operation period in which the catalyzed trap material adsorbs hydrocarbons and during an operating period during which the temperature of the exhaust is elevated relative to its temperature during the cold operation period, whereby the catalyzed trap material releases adsorbed hydrocarbons and enhanced oxidizing conditions are established in the exhaust.

In this aspect of the invention, the exhaust temperature may be from about 30 to 200° C. during the cold operation period and from about 200° C. to 650° C. during the operating period.

Figure 1:
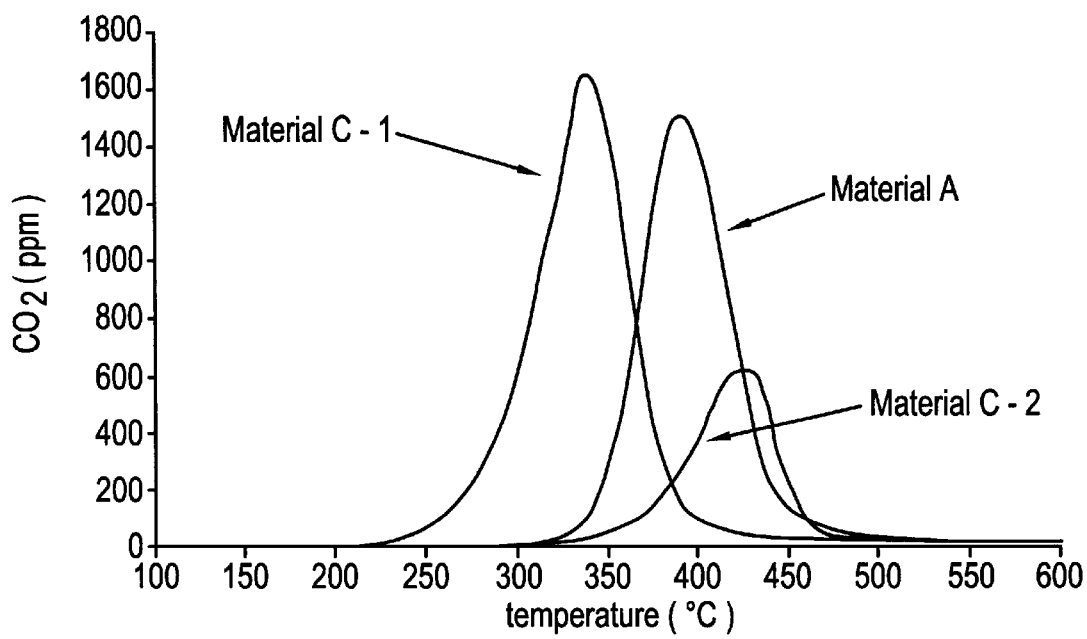
FIGS. 1 and 2 are graphs comparing the evolution of carbon dioxide from fresh and aged samples of a comparative catalyzed hydrocarbon trap material, and from a catalyzed hydrocarbon trap material in accordance with the present invention, the traps having been used to trap toluene (FIG. 1) and propene (FIG. 2)

DETAILED DESCRIPTION OF THE
INVENTION AND SPECIFIC EMBODIMENTS
THEREOF

The search for materials which can adsorb hydrocarbons at low temperatures, for example, from ambient temperatures up to about 200° C., and desorb or release the trapped hydrocarbons at temperatures greater than 200° C. for treatment by oxidation catalysts, has led to the known use of zeolites modified by the addition of metals thereto. For example, the above-described Japanese patent application ("the '650 Application") teaches that the presence of at least one type of ion of elements of Group IB of the Periodic Table, e.g., copper, silver and gold, especially silver, imparts to certain zeolites a high adsorptive capacity for hydrocarbons, even in the presence of water. Silver is stated to be particularly desirable in its ability to render the zeolite adsorptive for hydrocarbons even at relatively high temperatures. The '650 Application teaches that silica-to-alumina ratios of greater than 40 are necessary, and that exemplary zeolites are ZSM-5, USY and Beta zeolites. This prior art teaching is borne out by testing which shows that the trapping efficiency of silver-containing Beta and silver-containing ZSM-5 zeolite for propene and lean and stoichiometric conditions show good results, both for the freshly prepared silver-containing zeolites and for the aged compositions. Normally, such hydrocarbon trap materials will be used in conjunction with a catalytic material capable of catalyzing the oxidation of hydrocarbons.

Compositions in which a silver-containing zeolite and an oxidation catalyst containing one or more of platinum, palladium and rhodium are combined, suffered from the tendency, especially at relative high temperatures of 500° C. or more, of the silver to migrate from the zeolite onto the oxide support containing the platinum group metal. The '650 Application teaches that the silver-containing zeolite and the catalyst are separately prepared and may be used either by having particles of each intimately admixed in a single coating on a substrate, or by having separate zeolite and catalyst layers coated one over the other. In either case, migration of silver onto particles containing the dispersed platinum group metal reduces the catalytic efficiency of the platinum group metal. The problem is more pronounced when the zeolite hydrocarbon trap particles and the catalyst material particles comprise an intimate admixture of extremely fine particles in a single layer.

Silver-Modified Zeolites

Silver-modified zeolites, especially silver-modified ZSM-5, silver-modified Beta and silver-modified Y zeolites, show highly satisfactory performance in trapping hydrocarbons, including low molecular weight olefins, and releasing them within the light-off temperature range of an oxidation catalyst. Silver-modified MCM-22 and EU-1 zeolites are also useful for the purpose. The "light-off" temperature of a catalyst is that temperature at which the catalyst is effective for catalyzing the oxidation of at least 50% of the hydrocarbons contacted with the catalyst. The following Table shows key data for certain zeolites which, except for the Y zeolite, are useful in the practices of the present invention. The Y zeolite can be treated to be useful in the practices of the present invention by increasing its Si to Al atomic ratio to at least 10.

TABLE I

| Zeolite | Usual As-Synthesized Si to Al Atomic Ratio | Minimum Aperture Diameter[1] (Angstroms) | Maxium Aperture Diameter[1] (Angstroms) |
|---|---|---|---|
| Y | 2 to 3 | 7.4 | 7.4 |
| USY | ~10 | 7.4 | 7.4 |
| Beta | >10 | 5.5 | 7.6 |
| ZSM-5 | 10 to infinite[2] | 5.1 | 5.6 |
| EU-1 | >10 | 4.1 | 5.7 |
| MCM-22 | >10 | 4.5 | 5.5 |

[1] The "aperture diameter" is the crystallographic distance between the oxygen atoms on opposite sides of the ring opening.
[2] The term "infinite" is used to indicate that there may be very little or no Al in the as-synthesized ZSM-5 zeolite.

The ZSM-5-type structure is the only one of the above-listed zeolites that can be synthesized without any aluminum in the preparation. The other above-listed zeolites need the added aluminum for synthesis. All of them except Y can be leached to remove Al to attain extremely high Si to Al atomic ratio levels (up to 300 or higher). Y zeolite cannot be leached to such high levels but Si to Al atomic ratios of 10 to 20 or possibly higher can be readily attained for Y zeolite by leaching aluminum from it. Generally, a zeolite meeting the aperture diameter criteria and (except for Y zeolite) having a Si to Al atomic ratio of about 10 to 300, e.g., of about 10 to 150, is well suited to the practices of the present invention. An atomic ratio of about 10 to 20 for Y zeolite is well suited to the practices of the present invention.

As sometimes used herein, the silver content of the zeolite or zeolites which serve as the hydrocarbon trap ("trap zeolite") is expressed as, for example, 7% Ag/ZSM-5. This notation means that the amount of silver present in the trap material is 7 percent by weight Ag, based on the total calcined weight of the silver plus the trap zeolite. If two metals are dispersed on the zeolite, a notation such as "4% Ag, 2.8% Pd/ZSM-5" is used on the same basis (total calcined weight of the metals plus the trap zeolite). Similarly, for the metal content of the refractory inorganic oxide-supported catalyst, a notation such as 6% Pd/Al$_2$O$_3$ means that the catalyst is an alumina-supported catalyst material and the trap material contains 6% by weight Pd based on the total calcined weight of the Pd plus the refractory inorganic oxide support material. The use of such notation is not to be taken as requiring or implying that, in the case of the trap zeolite, all the silver or all the silver plus palladium present is dispersed on the trap zeolite, nor, in the case of the supported catalyst, that all the palladium present is dispersed on the alumina or other support material.

The refractory inorganic oxide support for the catalyst material may be any one or more suitable oxides, including zeolites. When serving as a catalyst support, the zeolite need not, although it may have, the Si to Al ratio and pore aperture diameter required for the zeolite which serves as the hydrocarbon trap material.

References are made herein to the "loading" on honeycomb carriers of the "washcoat" (the mixture comprising catalytic metal-carrying zeolite and metal oxide particles) and the metals on so-called "honeycomb" or "monolith" carriers. These well-known carriers comprise bodies made of ceramic-like material such as cordierite, mullite, etc., having a plurality of fine, substantially parallel gas-flow passages extending therethrough. The washcoat is coated on the walls of these passages and the exhaust being treated is passed through the passages. The washcoat loading, i.e., the amount of washcoat (dry basis, after calcining) deposited on the carrier, is given in grams per cubic inch ("g/in$^3$") of volume of the catalyst, in order to account for the voids provided by the gas-flow passages. The loading of the catalytic metals on the carriers is similarly defined in terms of grams of metal per cubic foot ("g/ft$^3$"). All loadings referred to herein are on a post-calcined, dry basis, i.e., the loading of the finished catalyst.

EXAMPLE 1

A. A slurry of ZSM-5 zeolite particles having silver dispersed thereon was prepared by dissolving 7.87 grams ("g") silver nitrate in 100 g deionized water and adding 95 g ZSM-5 (Si to Al atomic ratio of 20). The ZSM-5 may be of the type made with or without an organic template. If it was made without a template, it must be in the hydrogen form because the high pH of the sodium form would cause silver to precipitate. An ammonium silicate solution was added as a binder to give a final SiO$_2$ concentration from the binder in the dehydrated slurry of 2% by weight of the weight of dehydrated solids. The ZSM-5 particles contained 5% by weight Ag, dry basis. The slurry was ball milled to a particle size range in which 90% of the particles were less than 10 microns in diameter. The solids content of the slurry was adjusted with deionized water to a level suitable for coating onto a cordierite monolith core. The monolith core was 0.75 inch (1.91 cm) in diameter by 0.75 inch (1.91 cm) long and was coated to provide a washcoat loading of 2 g/in$^3$ after calcining. The washcoated core was dried at 140° C. for 1 hr and calcined in air at 500° C. for 4 hours to provide a hydrocarbon trap.

B. A laboratory reactor was supplied with a feed gas composition (calculated on a volume basis) of 570 ppm propene calculated as $C_1$ or 190 ppm as the molecule, 0.57% carbon monoxide, 0.19% hydrogen, 13% water as steam, 15 ppm sulfur dioxide, and an oxygen concentration such that the actual air-to-fuel ratio divided by the stoichiometric air-to-fuel ratio (lambda) was equal to 1.01. An adsorption phase was carried out by flowing the hydrocarbon-containing feed gas through the trap for 1 minute and 45 seconds at 75° C. and a gas flow rate equivalent to 50,000 hr space velocity. The space velocity is the volumes of gas, measured at conditions of 25° C. temperature and one atmosphere pressure, flowed through the catalyzed hydrocarbon trap, per volume of the trap. Thus, a "space velocity" of 50,000/hr means 50,000 volumes of gas measured at the reference temperature and pressure per volume of trap, per hour. The trap is the honeycomb carrier core on which the washcoat of catalyzed hydrocarbon trap material has been coated. Reference in the following examples (except Example 11) to an "adsorption phase" means an adsorption phase as carried out in this Part B of Example 1.

C. In a test of the trap of part A of this Example 1, the trap adsorbed 80% of the total propene content of the stream during the 1¾ minute adsorption phase, corresponding to 2.2 mg propene adsorbed per gram of Ag/ZSM-5 washcoat. The hydrocarbon flow was then shut off and a desorption phase was started by heating the trap at a rate of 50° C. per minute to a temperature of 500° C. (In some of the following examples the trap was heated only to 400° C. during the desorption phase.) During this heating, the trap retained 60% of its total propene exposure at 100° C., 50% of its total propene exposure at 200° C., 30% of its total propene exposure at 300° C., and 5% of its total propene exposure at 400° C. As used herein, total propene (or other hydrocarbons) exposure means the total amount of propene (or other hydrocarbons) to which the trap was exposed during the adsorption phase. Reference in the following examples (except Example 11) to a "desorption phase" means a desorption phase as carried out in this Part C of Example 1.

Example 1 demonstrates the ability of the zeolite portion of the catalyzed hydrocarbon trap material to adsorb a high proportion of the hydrocarbon content of the stream at a low temperature and its propensity to release it at more elevated temperatures.

EXAMPLE 2

The unique ability of Ag on ZSM-5 to trap light olefins, in this case propene, and the relative inability of silver-exchanged larger aperture zeolites such as Beta and Y zeolites to do the same, is demonstrated in this example. Three hydrocarbon trap materials ("traps") were formulated as in Part A of Example, 1 differing in these particulars: for Trap 1, a 10% Ag on ZSM-5 slurry was equilibrated for up to 17 hours at 60° C. to ion-exchange silver ions onto the zeolite. The silver-containing zeolite particles were then dewatered through filter paper supported on a Buchner funnel, the resulting filter cake was washed with deionized water, and the material was dried and calcined as in Part A of Example 1. The ion exchange and calcining process was then repeated twice more. The resulting calcined Ag/ZSM-5 powder contained 3.9% Ag. (All references in this specification and in the claims to percentage of silver are on the basis of the weight of the Ag as a percentage of the total dry basis (calcined) weight of Ag and the zeolite.) A slurry was then prepared by combining 100 grams of deionized water and 100 grams of the calcined Ag/ZSM-5 powder, adding ammonium silicate binder and washcoating as in Example 1, except the washcoat loading was at 2.75 g/in$^3$. Trap 2 was prepared as in Example 1, except substituting Beta zeolite (Si to Al atomic ratio of 13) and then proceeding through the first ion exchange step as for Trap 1. The resulting calcined Beta zeolite powder contained 3.3% Ag. This Ag/Beta material was then coated onto a cordierite monolith as in the preparation of Trap 1, except at a washcoat loading of 2.7 g/in$^3$. Trap 3 was prepared in the same manner as was Trap 2, but substituting Y zeolite (Si to Al atomic ratio of 20) for the Beta zeolite. The calcined powder used to prepare Trap 3 was 2.0% Ag on Y zeolite, and was applied as a washcoat, as in the case of Trap 1, except at a loading of 2.9 g/in$^3$.

A test feed gas as described in Example 1 was flowed through each of the Traps 1–3 in the reactor in an adsorption phase, and a desorption phase was then carried out, with the following results.

| Trap No. Zeolite (% Ag) | Adsorption Phase % Total HC Adsorbed at Indicated Temp.[1] | Desorption Phase Remaining % of Total HC at Indicated Temperature[2] | | | |
|---|---|---|---|---|---|
| Temp. ° C. → | 75 | 100 | 200 | 300 | 400 |
| 1. ZSM-5 (3.9) | 85 | 70 | 68 | 52 | 20 |
| 2. Beta (3.3) | 45 | 15 | 10 | 5 | 0 |
| 3. Y (2.0) | 30 | 10 | 5 | 0 | 0 |

[1]The percentage of the total amount of hydrocarbon to which the trap was exposed during the adsorption phase ("Total HC") which remains adsorbed in the trap at the end of the adsorption phase, which was carried out at 75° C.
[2]The percentage of Total HC that remains adsorbed in the trap when the indicated temperature of the desorption phase was attained.

The results of this Example demonstrate the capability of silver-exchanged ZSM-5 to trap light olefins, i.e., those having relatively small molecules, and the relatively poor ability of silver-exchanged Beta and Y zeolites to do the same. (Example 9 shows the relative adsorption capabilities of ZSM-5, Beta and Y zeolites for larger (xylene) molecules.)

EXAMPLE 3

The ability of zeolites with Si to Al atomic ratios of greater than 10 to trap and retain toluene up to rather high temperatures is demonstrated in this example. Trap 1, Trap 2 and Trap 3 of Example 2, and three more Ag-exchanged zeolites were compared. Trap 4 is a 3.5% Ag/ZSM-5 using a ZSM-5 of Si to Al atomic ratio of 65 prepared as in the case of Trap 2, and applied as a washcoat at a loading of 2.87 g/in$^3$. Trap 5 is a 0.63% Ag/Beta using a Beta zeolite of Si to Al atomic ratio of 80 prepared as in the case of Trap 2, and applied as a washcoat at a loading of 2.2 g/in$^3$. Trap 6 is a 4.7% Ag/USY using a USY zeolite of Si to Al atomic ratio of 2.7 prepared as was Trap 2, and washcoated at a loading of 2.6 g/in$^3$.

The traps were tested with a feed gas in a laboratory reactor as described in Parts B and C of Example 1, except using toluene as the hydrocarbon at a concentration of 550 ppm as $C_1$ or 78 ppm as the molecule. The results are tabulated below.

| Trap No. Zeolite (Si to Al Ratio) | Adsorption Phase % Total HC Adsorbed at Indicated Temp.[1] | Desorption Phase Remaining % of Total HC at Indicated Temperature[2] | | | |
|---|---|---|---|---|---|
| Temp. ° C. → | 75 | 100 | 200 | 300 | 400 |
| 1. ZSM-5 (20) | 95 | 95 | 95 | 95 | 90 |
| 2. Beta (13) | 95 | 95 | 95 | 95 | 90 |
| 3. Y (20) | 90 | 90 | 90 | 75 | 25 |
| 4. ZSM-5 (65) | 90 | 90 | 90 | 85 | 60 |
| 5. Beta (80) | 95 | 90 | 90 | 85 | 60 |
| 6. USY (2.7) | 20 | 5 | 5 | 5 | 5 |

[1],[2]See Footnotes to the table in Example 2.

The results of this Example 3 demonstrate that the high Si to Al atomic ratio zeolites (Traps 1–5) are capable of trapping and retaining toluene much more effectively than those zeolites with a Si to Al atomic ratio of less than 10 (Trap 6).

EXAMPLE 4

A. A catalyzed hydrocarbon trap material in accordance with the present invention was prepared by combining in a ball mill 150 grams of ZSM-5 zeolite having a Si-to-Al atomic ratio of about 20 and of the type synthesized without a template, 17.8 grams silver nitrate, 150 grams gamma alumina, 47.6 grams of palladium nitrate solution containing 20.2% palladium by weight, and 316 grams of deionized water. The slurry was ball milled until the particle size distribution was 90% of the particles being less than 9 microns in diameter. As all ingredients are mixed in the same vessel, this method is sometimes referred to as the single pot method of preparation. The slurry was twice coated onto a 0.75 inch (1.91 cm) diameter by 0.75 inch (1.91 cm) long cordierite monolith, the first time at 46% solids and the second time at 40% solids, to achieve a total washcoat loading of 4.28 g/in³ following drying at 140° C. for at least 1 hour and calcining at 500° C. to decompose the counter ions associated with the silver and palladium salts. The catalyzed trap contained equal portions by weight of metals-containing ZSM-5 and metals-containing $Al_2O_3$, on the above-described basis of 7% Ag/ZSM-5 and 6% Pd/$Al_2O_3$. This catalyzed hydrocarbon trap material is designated trap P1.

B. A comparative 9% Ag/ZSM-5 and 6% Pd/$Al_2O_3$ hydrocarbon trap material was prepared using separate vessels to prepare the zeolite and palladium catalyst components as is conventional. The zeolite was prepared as follows. 360 grams of ZSM-5 (Si-to-Al atomic ratio approximately 20) of the type synthesized without an organic template was slurried with 500 grams deionized water, and 63 grams of silver nitrate dissolved in concentrated ammonium hydroxide solution was added to the slurry. The pH of the slurry was maintained at greater than 10 by the addition of ammonium hydroxide as needed, and equilibrated for 1 hour to ion-exchange silver into the zeolite. The slurry was then filtered through filter paper on a Buchner funnel, washed with deionized water, dried at 140 to 170° C. for at least 2 hours, and calcined at 500° C. for two to three hours. The resulting zeolite material was 9% Ag/ZSM-5.

C. The Pd catalyst was prepared separately from the zeolite material of Part B of this Example by the incipient wetness impregnation of 800 grams of gamma alumina with 254 grams of 20.11% palladium nitrate solution and 210 grams of deionized water. The impregnated powder was calcined at 550° C. for 2 hours, and ball milled at approximately 50% solids (in deionized water) to a particle size of 90% of the particles being less than 10 microns. The resulting slurry of palladium catalyst was 6% Pd/$Al_2O_3$.

D. The solids of the 6% Pd/alumina slurry described in part C of this Example was adjusted with deionized water to 41.2%, and 328 grams of this slurry was combined with 100 grams of deionized water and 135 grams of the 9% Ag/ZSM-5 obtained in part B of this Example. The mixture was ball milled to achieve thorough mixing. The resulting mixed slurry solids was adjusted for coating by the addition of deionized water, and coated onto a 0.75 inch (1.91 cm) diameter by 0.75 inch (1.91 cm) long cordierite monolith and calcined at 500° C. for 1 hours. The calcined coating weight was 3.83 g/in³. The resulting catalyzed trap contained equal portions by weight of 9% Ag/ZSM-5 and 6% Pd/$Al_2O_3$ and is designated Trap S1. The method of preparation is sometimes referred to as the separate vessel method.

EXAMPLE 5

The catalyzed Traps P1 and S1 prepared in Example 4 are tested according to the procedure of Parts B and C of Example 1, except 2000 ppm by volume toluene (as C1; 286 ppm by volume as the molecule) was used in the feed gas in place of propene, and no carbon monoxide or hydrogen was used in the feed gas. The catalyzed traps P1 and S1 were tested both in their fresh condition and after aging for 16 hours at 550° C. in a stream comprised of 13% water by volume as steam, 15 ppm by volume sulfur dioxide, balance nitrogen, with the following results.

| Trap No. (Condition) | Adsorption Phase % Total HC Adsorbed at Indicated Temp.[1] | Desorption Phase Remaining % of Total HC at Indicated Temperature[2] | | | | |
|---|---|---|---|---|---|---|
| Temp. ° C. → | 75 | 100 | 200 | 300 | 400 | 500 |
| S1 (Fresh) | 78 | 72 | 70 | 69 | 68 | 68 |
| P1 (Fresh) | 68 | 66 | 64 | 63 | 63 | 63 |
| S1 (Aged) | 80 | 73 | 69 | 61 | 51 | 51 |
| P1 (Aged) | 82 | 74 | 70 | 63 | 52 | 52 |

[1],[2]See Footnotes to the table in Example 2.

The results of this Example demonstrate that the aged catalyzed trap produced by the single vessel method of preparation is as efficient at adsorbing and retaining the aromatic molecule toluene as the aged catalyst trap prepared by the separate vessel method of preparation. It is seen that following aging, both catalyzed traps give comparable results. Prior to aging, there is only a slight advantage for the adsorption of toluene shown by the fresh catalyst trap prepared by the separate vessel method, in which the silver and palladium metals are segregated onto their respective oxides.

EXAMPLE 6

The aged catalyzed traps of Example 5 were tested according to the procedure in Parts B and C of Example 1 for the adsorption of a small molecule olefin, propene, except that carbon monoxide and hydrogen were omitted from the feed gas. The data from these tests were as follows.

| Trap No. (Condition) | Adsorption Phase % Total HC Adsorbed at Indicated Temp.[1] | Desorption Phase Remaining % of Total HC at Indicated Temperature[2] | | | | |
|---|---|---|---|---|---|---|
| Temp. °C. → | 75 | 100 | 200 | 300 | 400 | 500 |
| S1 (Aged) | 58 | 38 | 32 | 27 | 25 | 25 |
| P1 (Aged) | 68 | 45 | 39 | 36 | 33 | 33 |

[1],[2]See Footnotes to the table in Example 2.

The above results demonstrate that aged catalyzed trap material made by the single vessel method of preparation is more efficient at adsorbing and retaining the small olefin molecule propene than aged catalyzed trap material made by the conventional separate vessel method of preparation.

The above results show that after hydrothermal aging, there is no advantage to segregating the silver onto the ZSM-5 and palladium onto the alumina as accomplished by the conventional single-vessel method used to make trap S1. In fact, the above data show a slight advantage for the trap material P1 prepared by the single-vessel method of the present invention.

EXAMPLE 7

A catalyzed hydrocarbon trap material in accordance with the present invention was prepared according to the general procedure of Part A of Example 4, but differing in the following particulars. Equal portions by weight of Beta zeolite with a Si-to-Al atomic ratio of 13 and ZSM-5 zeolite with a Si to Al atomic ratio of about 20 were mixed and substituted for the ZSM-5 of Part A of Example 4. The amount of silver present was 5% by weight of the total weight of silver plus Beta plus ZSM-5 zeolite. The catalyzed trap of this example was tested after aging for 16 hours at 600° C. in a gas stream of 2000 ppm by volume of a hydrocarbon mixture that was 70% toluene and 30% propene as $C_1$, 13% by volume water as steam, 15 ppm by volume sulfur dioxide, oxygen as air to give a lambda of 1.01, and the balance being nitrogen. The aged catalyzed trap was tested for adsorption of toluene according to the procedure described in Example 5, and for the adsorption of propene according to the procedure described in Example 6. The results are tabulated below.

| Hydrocarbon | Adsorption Phase % Total HC Adsorbed at Indicated Temp.[1] | Desorption Phase Remaining % of Total HC at Indicated Temperature[2] | | | | |
|---|---|---|---|---|---|---|
| Temp. °C. → | 75 | 100 | 200 | 300 | 400 | 500 |
| Propene | 58 | 48 | 35 | 29 | 27 | 26 |
| Toluene | 86 | 78 | 73 | 62 | 56 | 56 |

[1],[2]See Footnotes to the table in Example 2.

The above results demonstrate that the substitution of Beta zeolite for a portion of the ZSM-5 in the single vessel method of preparation gives a catalyzed trap with comparable performance to one, such as Trap P1 of Examples 4 and 5, with ZSM-5 as the sole zeolite. The performance of this ZSM-5/Beta trap is seen to be better for toluene than for propene.

EXAMPLE 8

A. A catalyzed hydrocarbon trap material in accordance with the present invention was prepared by combining in a ball mill 150 grams of ZSM-5 zeolite having a Si to Al atomic ratio of approximately 20 and of the type synthesized without an organic template, 17.8 grams of silver nitrate, 150 grams of gamma alumina, 47.6 grams of palladium nitrate solution containing 20.2% palladium by weight, and 316 grams of deionized water. The slurry was ball milled until the particle size distribution was 90% of the particles being less than 9 microns in diameter. The slurry was twice coated onto a 0.75 inch (1.91 cm) diameter by 0.75 inch (1.91 cm) long cordierite monolith, the first time at 46% solids and the second time at 40% solids, to achieve a loading of 4.08 g/in³ following drying at 140° C. for at least 1 hour, after each coating, and calcining at 500° C. to decompose the counter ions associated with the silver and palladium salts. The catalyzed hydrocarbon trap material was aged for 16 hours at 550° C. in 13% $H_2O$, 15 ppm $SO_2$, balance nitrogen, and designated Material A.

B. Fresh and aged versions of a comparative catalyzed hydrocarbon trap material were prepared as follows.

(1) Gamma alumina powder containing 2% by weight platinum was prepared by impregnation of an anionic platinum salt solution to incipient wetness, addition of nitric acid and water to a solids content of approximately 50%, and milling to a particle size of 90% of the particles being less than 10 microns in diameter.

(2) In a separate container from that used in sub-part (1) of this Part B, a nominally 4% Ag, 2.8% Pd/ZSM-5 was prepared as follows. 100 grams of a ZSM-5 powder with a Si to Al atomic ratio of approximately 20 and of the type prepared without template was combined with 6.3 grams silver nitrate dissolved in concentrated ammonium hydroxide, 21.2 grams of palladium tetraamine acetate solution containing 13.3% palladium by weight, and 100 grams of deionized water. The slurry was mixed for 3 hours, filtered through filter paper on a Buchner funnel, washed with deionized water, dried at 120 to 170° C. for at least 2 hours, and calcined at 500° C. for 1 hour.

(3) 43 grams of the 2% Pt/gamma alumina slurry of sub-part (1) and 20 grams of the nominally 4% Ag, 2.8% Pd/ZSM-5 zeolite powder of sub-part (2) were combined with 20 grams deionized water, milled for approximately 1 hour to achieve good mixing, and coated at 2.87 g/in³ on a 0.75 inch diameter, 0.75 inch long cordierite monolith core. This catalyzed trap was calcined at 500° C. to achieve decomposition of the counter ions associated with the silver, palladium and platinum. The resulting fresh comparative catalyzed trap was designated Material C-1. A sample of the comparative catalyzed trap was aged for 17 hours at 550° C. in 13% water as steam, 15 ppm sulfur dioxide, balance nitrogen, and the resulting aged catalyst trap was designated Material C-2.

C. Materials A, C-1 and C-2 were tested substantially according to the procedure described in Parts B and C of Example 1, except that the hydrocarbon in the feed gas stream was toluene at a concentration of 2000 ppm calculated as $C_1$, or 286 ppm toluene as the molecule, and the gas stream did not contain carbon monoxide or hydrogen, and the adsorption was carried out at 70° C. instead of 75° C. Materials A, C-1 and C-2 were also tested for the adsorption and retention of propene according to the procedure described in Parts B and C of Example 1, except that the gas stream did not contain carbon monoxide or hydrogen and the propene was at a concentration of 570 ppm as $C_1$.

Figure 2:
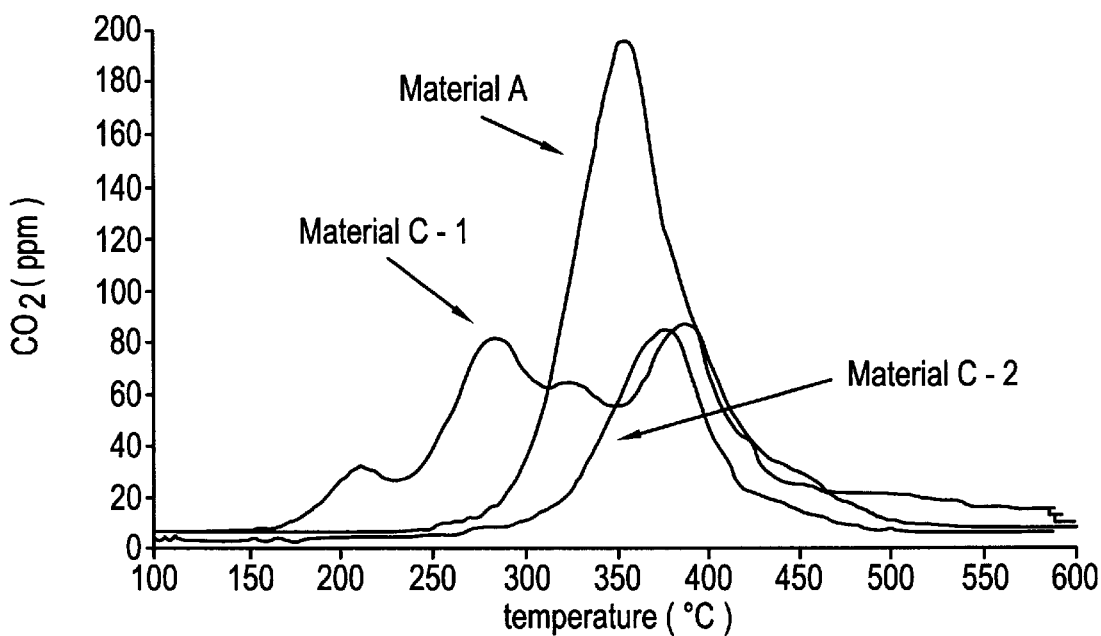

D. The results of the testing of Part C of this Example 8 are shown in FIGS. 1 and 2. These Figures are plots of the evolution of $CO_2$ from catalyzed hydrocarbon trap materials A, C-1 and C-2 as a function of temperature following the adsorption at 70° C. of toluene (FIG. 1) or propene (FIG. 2) in the laboratory reactor of Example 1. FIGS. 1 and 2 show the oxidation of the hydrocarbon adsorbed by the trap as the temperature is raised. The oxidized hydrocarbon is evolved from the trap as $CO_2$ (shown in FIGS. 1 and 2) and as non-burned hydrocarbon (not shown). Note that the comparative trap Material C-1 comprised of fresh Pt/alumina plus Ag- and Pd-exchanged ZSM-5 shows oxidation of the hydrocarbon commencing at 225° C. and reaching a maximum $CO_2$ desorption rate at 340° C. Following aging (550° C. in 13% steam, 15 ppm $SO_2$, balance $N_2$ stream), it is seen that for the aged comparative trap Material C-2, desorbed $CO_2$ is not observed until 340° C. and reaches a maximum desorption rate at 425° C. The amount of $CO_2$ evolved from the aged Material C-2 is considerably less than in the case of the fresh Material C-1, as a consequence of the higher light-off temperature of Material C-2. (The light-off temperature is the temperature at which 50% of the hydrocarbons present are oxidized.) A comparison of the performances of Material C-1 and C-2 indicates that the platinum of the aged material has been poisoned by migration of the silver. It will be noted that for the aged Material C-2 more hydrocarbon is desorbed from the trap prior to reaching the temperature at which the Ag-poisoned Pt can oxidize the hydrocarbon to $CO_2$. Consequently, the hydrocarbon which is desorbed prior to the trap's reaching the temperature at which the poisoned platinum can oxidize the hydrocarbon to $CO_2$ is discharged to the atmosphere. Also note that when compared to Material A comprising an embodiment of the present invention, the poisoned (aged) trap Material C-2 has a higher light-off temperature and lower $CO_2$ evolution.

E. FIG. 2 shows for the adsorption of propene the same poisoning phenomenon of comparative material C-2 as illustrated in FIG. 1 for toluene, and the superior performance of Material A, comprising an embodiment of the present invention.

If the catalyst-poisoning tendencies of silver, as demonstrated by Example 8, could be overcome or avoided, significant advantages would be attained by providing the silver-modified zeolite and oxidation catalyst in intimate contact with each other because, not only does the intimately contacted oxidation catalyst oxidize the released hydrocarbons at their source (the zeolite), but it also catalyzes the combustion of coke which tends to form on the silver-modified zeolite hydrocarbon trap material because of decomposition of some of the hydrocarbons trapped therein. The catalyst should have a light-off temperature lower than the temperature of significant HC release, i.e., less than 300° C. However, at such elevated temperatures the problem of migration of silver and consequent poisoning of the catalyst is aggravated. This militates against providing the Ag-modified zeolites and the platinum group metal catalyst in intimate contact with each other.

Surprisingly, it has now been found that although the prior art concerns that silver would poison the platinum group metal catalyst are well-founded, at least with respect to platinum and rhodium, palladium appears to be unaffected by silver migration to a palladium oxidation catalyst, at least in the practice of the present invention. Accordingly, contrary to the precepts of the prior art, it has been found that silver can be intimately admixed with palladium without adversely affecting the catalytic activity of the palladium for oxidation of hydrocarbons. In fact, in accordance with the present invention, it has been found possible to prepare a catalyzed hydrocarbon trap material comprising palladium and silver dispersed on both high surface area metal oxide particles and zeolite particles, by combining all the ingredients in a single vessel to provide a highly efficient "one-pot" manufacturing method. As a result, not only is the particulate catalyst intimately mixed with the particulate hydrocarbon trap, but both silver and palladium are dispersed on both the zeolite and metal oxide support particles.

Therefore, in accordance with the teachings of the present invention, a palladium oxidation catalyst is combined with the silver-containing zeolite material to oxidize the hydrocarbons eventually released from the zeolite material.

Thus, the oxidation catalyst catalyzes the oxidation of hydrocarbons released by the trap at elevated temperatures and prevents the build-up of coke on the trap by catalyzing the combustion of coke or coke precursors. The latter maintains the trap's capacity for adsorption of hydrocarbons. Alternatively, or in addition, the palladium component may be co-exchanged or co-immersed with the Ag in the zeolite trap material. The mixing of the Pd oxidation catalyst with the hydrocarbon trap material enables the oxidation catalyst to prevent the coke from building up on the trap by oxidizing the coke formed on the trap to $CO_2$ at oxygen concentrations typically observed in automobile exhaust. Surprisingly, the coke burn-off occurs at temperatures lower than the desorption temperature of most of the hydrocarbon on the trap, and is initiated by the oxidation of a small amount of hydrocarbon desorbed from the trap. The burning of this small hydrocarbon leakage from the trap is enough to generate an exotherm that perpetuates the desorption and oxidation of hydrocarbon on the trap.

A feature of the Ag-zeolite hydrocarbon trapping system is its high temperature retention of hydrocarbon molecules containing $\pi$ bonds. As noted above, hydrocarbon retention above the light-off temperature of the oxidation catalyst is necessary to prevent cold operation period desorption of the trapped hydrocarbon without effective catalytic treatment into the automobile exhaust, where it constitutes hydrocarbon emissions.

EXAMPLE 9

The effect of zeolite aperture size on the adsorption of large molecules is demonstrated in this example, which records tests which were conducted to evaluate hydrocarbon retention for the adsorption of xylene by a Ag/ZSM-5 trap. Adsorption phase testing and desorption phase testing as described in parts B and C of Example 1 were conducted, except that the test gas contained 550 ppm of mixed xylenes (as $C_1$) instead of the propene. The xylene mixture is 40% para-xylene, 60% mixed ortho- and meta-xylene. It is known that para-xylene, having a linear configuration of the methyl groups on the benzene ring, has a dimensionally smaller aspect than either the ortho- or meta-xylene isomers. Four Ag/zeolites were tested: the 5% Ag/ZSM-5 described in Example 1, the 3.5% Ag/ZSM-5 (Si to Al atomic ratio of 65) of Example 4 (Trap 4), the 3.3% Ag/Beta zeolite of Example 3 (Trap 2), and the 2% Ag/Y zeolite of Example 3 (Trap 3). The Ag/Beta zeolite and the Ag/Y zeolite, both having apertures wider than the widest aspect of the ortho- and meta-xylene molecules, adsorbed nearly 100% of the xylene mixture to which they were exposed. Specifically, the Ag/Beta and the Ag Y zeolites adsorbed 99% and 97% of the xylenes at 75° C., and retained 98% and 92% at 300° C., 94% and 50% at 400° C., and 89% and 10% at 500° C. of total hydrocarbon exposure, respectively. The 5%

Ag/ZSM-5 zeolite and the 3.5% Ag/ZSM-5 zeolite, both having smaller apertures than the Beta or Y zeolites, adsorbed largely only that 40% fraction of the xylene mixture comprised of the smaller-aspect para-xylene. Specifically, the 5% Ag/ZSM-5 zeolite and the 3.5% Ag/ZSM-5 zeolite adsorbed 52% and 50% of the xylenes at 75° C., and retained 50% and 45% at 300° C., and 42% and 10% at 500° C., of total xylene exposure, respectively.

The results of this Example 9 demonstrate the capability of silver-exchanged Beta and Y zeolites to trap large x-bonded molecules, and the relatively poor ability of ZSM-5 zeolite to do the same. (Example 3 shows the relative adsorption capabilities of ZSM-5, Beta and Y zeolites for smaller (propene) molecules.)

The different relative abilities of different zeolites such as ZSM-5, Beta, Y, MCM-2 and EU-1 zeolites, to adsorb relatively small and large hydrocarbons may be utilized by providing a catalyzed hydrocarbon trap material which contains only one or a mixture of two or more silver-containing zeolites. For example, silver-containing ZSM-5 alone or a combination of it and one or both of silver-containing Beta and Y zeolites may be used. With such a combination, high-efficiency adsorption of both relatively small and large hydrocarbons may be attained. In one embodiment, the mixture of silver-containing zeolites may contain from 5 to 95 weight percent of ZSM-5, and from 95 to 5 weight percent of one or both of Beta and Y zeolites. The selection of zeolites will depend on the nature of the hydrocarbons in the exhaust or other stream being treated and the objectives of the treatment.

Manufacturing Method

A method of manufacturing, by the single vessel ("one-pot") method, a catalyzed hydrocarbon trap material is as follows. Generally, in a ball mill provided with alumina grinding media such as alumina balls there were combined particulate ZSM-5 or Beta zeolite, particulate gamma alumina, silver nitrate and acidic palladium nitrate solutions, and enough de-ionized water to prepare a slurry having a desired solids content, typically 50% solids. The ingredients were selected to provide desired proportions of the ingredients and in a preferred embodiment. For example, in one embodiment of the invention, the weight ratio of ZSM-5 or Beta zeolite to alumina (dry basis) is between 0.95 and 1.05. The silver concentration in the trap material (silver-containing zeolite plus alumina-supported palladium catalyst), as elemental silver relative to the calcined weight of the silver-containing zeolite, is 7% ±1%, and the palladium concentration in the trap material, as elemental palladium relative to the calcined weight of the palladium-containing alumina, is 6%±1%. The zeolite in this embodiment is of the type prepared without organic template and in the hydrogen form, with a Si to Al atomic ratio greater than 13 but less than 30. The gamma alumina may have a surface area, for example, greater than 90 m$^2$/g, and less than 150 m$^2$/g. The silver nitrate utilized may be either technical or reagent grade, and the palladium nitrate solution has a palladium concentration of less than 25%.

The slurry was milled to provide the zeolite and alumina solids in a particle size such that at least 90% of the particles have a diameter of about 5 to 15 microns. After the thorough mixing and grinding of the particulates in the ball mill was completed, distilled water was added to adjust the slurry solids to optimize coating onto a substrate such as a well-known cordierite monolith ("honeycomb"). Typically, the monolith will be coated by immersion into the slurry, possibly including the use of vacuum to draw the slurry into the fine channels of the monolith, which may be sized to provide anywhere from 200 to 600 parallel gas flow channels per square inch of end face area of the monolith. The walls of the gas flow channels are coated by the slurry. A typical coating sequence was to carry out an initial coating to deposit about 2 grams of the coating per cubic inch of monolith volume (dry basis). Drying was carried out at an elevated temperature, e.g., about 140° C., and a second coating was then applied to the dried first coating to add an additional two grams of coating per cubic inch of volume of the coated monolith (dry basis). This was followed by heating in air (calcining) at a temperature of approximately 450 to 600° C. All the coating weights were calculated on a dry basis. The weight of the coating is expressed in terms of weight per unit volume of catalyst, such as grams per cubic inch ("g/in$^3$"), in order to account for the void spaces in the catalyst provided by the channels through which the gas to be treated was flowed.

Thus, silver-exchanged ZSM-5 zeolites showed high efficiency for trapping olefins (ethylene and propene) and silver-exchanged Beta and ZSM-5 zeolites showed high efficiency for trapping aromatic molecules (toluene) under both lean and rich exhaust conditions. Other testing showed that ion-exchanging these zeolites with cations such as iron, molybdenum, barium, potassium, vanadium, copper, bismuth, cerium, palladium, manganese, tungsten and bismuth did not enhance the ability of the zeolite to adsorb hydrocarbons strongly under cold-start conditions of less than 100° C., and a water (steam) content of 11 to 13 volume percent. Such conditions are typical of internal combustion engine exhaust under cold-start conditions. Under dry conditions, copper enables the zeolite to strongly adsorb hydrocarbons starting at less than 100° C. However, in the presence of water or steam, copper-exchanged ZSM-5 lost the ability to adsorb hydrocarbons such as toluene. Only the silver-exchanged zeolites having a Si to Al atomic ratio greater than 10 showed the ability to strongly adsorb hydrocarbons at low temperatures in the presence of water vapor or steam.

Typical preparation of the catalyzed hydrocarbon trap material is given in the following example.

EXAMPLE 10

A. 650 grams of ZSM-5 zeolite, 650 grams of gamma alumina having a surface area of 150 m$^2$/g, a solution of silver nitrate containing 48.9 grams of silver, and an acidic solution of palladium nitrate containing 41.5 grams of palladium were mixed in a ball mill, together with alumina ball grinding media, and with sufficient deionized water to provide a 50% solids slurry. The combined ingredients were ball milled and samples were taken to measure the particle size of the zeolite and alumina solids with the grinding being continued until at least 90% of the particles had a diameter of less than 10 microns.

B. The slurry was then adjusted with deionized water to 45% solids and coated onto cordierite monoliths having 350 gas-flow channels per square inch of end face area. The monolith was immersed into the slurry, removed therefrom, and excess slurry was blown from the fine gas-flow channels with compressed air. The coated monolith was dried at 140° C., then weighed, showing a washcoat weight of about 2 g/in$^3$ for a calcined piece. The coating, and the drying process were repeated a second time after adjusting slurry solids to 37% to provide a total washcoat loading of 4 g/in$^3$ and a Pd loading of 200 g/ft$^3$. The dried monoliths were then calcined in air at 500° C. for a period of about 60 minutes to provide a finished catalyzed hydrocarbon trap material.

EXAMPLE 11

A. Three of the catalyzed hydrocarbon traps made pursuant to Example 10 were manufactured on cordierite monoliths of "racetrack", i.e., oval cross-sectional configuration, having a major axis of 6.68 inches (16.97 cm), a minor axis of 3.18 inches (8.08 cm), a length of 3 inches (7.62 cm) and 350 gas flow passageways ("cells") per square inch (54.3 cells per square centimeter). This preparation provided three catalyzed traps each having a volume of 55 in$^3$ (901.3 cubic centimeters, "cc"). In separate tests one of the catalyzed hydrocarbon traps was placed, like trap 10 of member 26 of FIG. 7, downstream of a high activity ("TWC") catalyst, such as catalyst 28 in member 30 of FIG. 7. One TWC catalyst (28 in FIG. 7) was used for testing (and is called the T-TWC) and a different TWC catalyst (28 in FIG. 7) was used for aging (and is called the A-TWC). The T-TWC catalyst had a precious metal loading of 70 g/ft$^3$ of platinum, palladium and rhodium in a Pt:Pd:Rh weight ratio of 1:10:1 dispersed on a loading of 2.1 g/in$^3$ of alumina plus other metal oxides including rare earth metal oxides. The volume of the T-TWC catalyst monolith was 42 in$^3$ (688 cc) and it had 600 gas flow passageways ("cells") per square inch (93 cells per square centimeter). The A-TWC catalyst had a precious metal loading of 110 g/ft$^3$ of palladium dispersed, together with nickel, on a loading of 3.3 g/in$^3$ of alumina plus other metal oxides including ceria. The A-TWC monolith had 400 gas flow passageways ("cells") per square inch (62 cells per square centimeter) and a total volume of 55 in$^3$ (901 cc).

Figure 7:
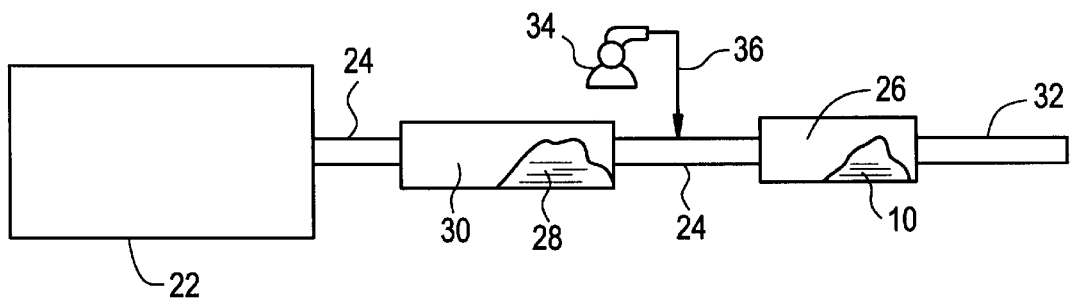
FIG. 7 is a schematic view of a catalyzed hydrocarbon trap member in accordance with an embodiment of the present invention employed in the exhaust line of an internal combustion engine.

The U.S. Federal Test Procedure (FTP), as set forth in 40 Code of Federal Regulations ("CFR"), Part 86, Sub-part B, the disclosure of which is incorporated by reference herein, was performed on the above TWC-catalyzed hydrocarbon trap combination. The exhaust treated in this test was generated by a 1994 Honda Accord 2.2 liter engine positioned relative to the TWC catalyst and the catalyzed hydrocarbon trap the same way as engine 22 of FIG. 7 is positioned relative to catalyst 28 and trap 10. The catalyzed trap was tested in a fresh state, obtaining continuous samples from both downstream of the T-TWC (before the catalyzed hydrocarbon trap) and after the catalyzed hydrocarbon trap. Using the A-TWC in place of the T-TWC, the combination was then aged for 50 hours in engine exhaust from a 1.8 liter Ford Contour engine, maintaining a temperature of 550° C. at the inlet of the catalyzed trap and a lambda of 1.00. A second FTP test was then conducted on the 50 hour, 550° C., stoichiometric aged catalyzed trap using the T-TWC upstream of the aged catalyzed trap. The catalyzed trap (with the A-TWC upstream) was then aged for 100 hours in engine exhaust using the Multiple Simulated Cold Start aging protocol (MSCS). MSCS aging is performed by cycling between adsorption and desorption phases. During the desorption phase, the TWC-catalyzed trap system is heated with engine exhaust to a trap inlet temperature of 550° C. and maintained at that temperature for 4 minutes to desorb the hydrocarbon it had initially trapped during a cold operation period adsorption phase. The exhaust then passed through a heat exchanger which cooled it and the TWC member and catalyzed trap, and an adsorption phase was carried out by maintaining the trap inlet at 50° C. for 5 minutes during which time it trapped hydrocarbon from the exhaust. The cycle was repeated 667 times during the 100 hours of MSCS aging. The catalyzed trap was then tested again with a third U.S. FTP test using the T-TWC upstream of the aged catalyzed trap.

Figure 3:
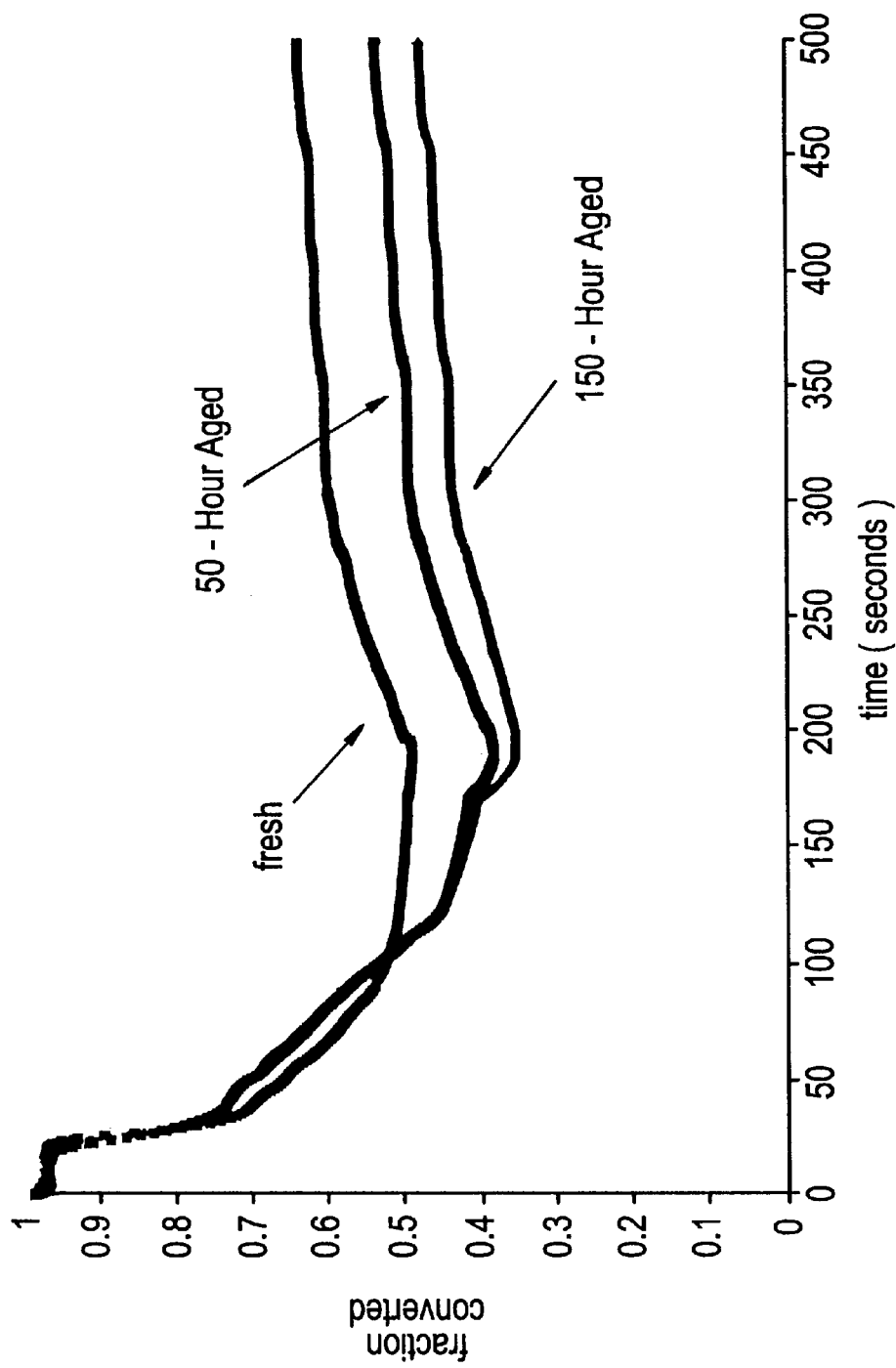
FIG. 3 is a graph showing the results of a U.S. Federal Test Procedure in which there is plotted (i) on the vertical axis, the fraction of hydrocarbons discharged from an upstream treatment catalyst that are converted to innocuous substances by the catalyzed hydrocarbon trap being tested, and (ii) on the horizontal axis, the elapsed time of the test.

B. FIG. 3 shows the fraction of hydrocarbons entering the catalyzed hydrocarbon trap which are converted by the trap to innocuous substances ($CO_2$ and $H_2O$) during Bag 1 of the FTP test. (Emissions from the FTP test are collected in three bags for testing. Bag 1 is the emissions generated from the cold start portion of the test. According to the test protocol, the engine must not have been operated for a period of at least twelve hours prior to starting the Bag 1 portion of the test. Bags 2 and 3 are used to collect the emissions from warned-up engines and catalysts at cruise, idle and warm-start engine operations.) It is during the Bag 1 portion of the test that the catalyst is cold and the catalyzed trap adsorbs hydrocarbons from the exhaust. The trap then burns the trapped hydrocarbons as the catalyzed trap member is heated by the exhaust. The vertical axis shows the fraction of the hydrocarbon converted by the catalyzed hydrocarbon trap member only and the horizontal axis is the time into the U.S. FTP test (500 seconds total) for accumulating the Bag 1 hydrocarbons. The cumulative total of hydrocarbons converted is equal to the hydrocarbon concentration exiting the catalyzed trap ("Tail Pipe Out HC" in the table in Part C below) divided by the hydrocarbon concentration exiting the upstream TWC catalyst ("TWC Out HC" in the table of Part C below) and entering the trap. The catalyzed trap was effective for trapping and burning the cold start hydrocarbons when fresh and after increasing degrees of aging. FIG. 3 shows the cumulative fraction of hydrocarbons converted by the catalyzed hydrocarbon trap during the 500 seconds of Bag 1 of the U.S. FTP with the catalyzed trap placed downstream of, respectively, the fresh, 50-hour aged and 150-hour aged TWC catalysts. It is seen that in all three cases the hydrocarbons emitted from the TWC catalyst were significantly reduced by the catalyzed trap. As may be discerned from the graph of FIG. 3 at the 500-second time and from the table of Part C of this Example (by dividing, for Bag #1, the Column C entries by the Column B entries and multiplying by 100), the percentage of the hydrocarbons emitted from the TWC catalyst and converted by the catalyzed hydrocarbon trap are, respectively, 64.5% for the fresh trap, 54.1% for the 50-hour Aged trap, and 48.3% for the 150-hour Aged trap. These represent very significant reductions over the hydrocarbon emissions that would be discharged to the atmosphere without the catalyzed hydrocarbon trap.

C. In the table of this Part C, under the "Trap Aging" heading, "Fresh" is the fresh trap, "50-Hour Aged" is the trap aged by 50 hours of exposure to stoichiometric engine exhaust at 550° C., and "150 Hour-Aged" is the trap having 50 hours of stoichiometric engine exhaust aging plus 100 hours of MSCS aging at 550° C. The following table shows the breakdown of hydrocarbons from each Bag of the FTP test, the total hydrocarbons at the exit of the upstream TWC, and the total hydrocarbon at the tail pipe. The most demanding portion of the test is Bag 1 when the TWC catalyst and the catalyzed hydrocarbon trap are cold.

| | Trap Aging | | |
|---|---|---|---|
| U.S. FTP Bag # (Total) | A. TWC Out HC[1] (g/mile) | B. Tail Pipe Out HC[2] (g/mile) | C. Difference A − B (g/mile) |
| Fresh | | | |
| 1 | 0.107 | 0.038 | 0.069 |
| 2 | 0.047 | 0.006 | 0.041 |
| 3 | 0.040 | 0.007 | 0.033 |
| (Total) | 0.195 | 0.051 | 0.144 |
| 50-Hour Aged | | | |
| 1 | 0.098 | 0.045 | 0.053 |

-continued

Trap Aging

| U.S. FTP Bag # (Total) | A. TWC Out HC[1] (g/mile) | B. Tail Pipe Out HC[2] (g/mile) | C. Difference A − B (g/mile) |
|---|---|---|---|
| 2 | 0.034 | 0.009 | 0.025 |
| 3 | 0.040 | 0.018 | 0.022 |
| (Total) | 0.172 | 0.072 | 0.100 |
| 150-Hour Aged | | | |
| 1 | 0.087 | 0.045 | 0.042 |
| 2 | 0.032 | 0.006 | 0.026 |
| 3 | 0.036 | 0.015 | 0.021 |
| (Total) | 0.156 | 0.066 | 0.090 |

[1]This is the hydrocarbon content in the exhaust which exits the TWC catalyst and prior to entering the catalyzed trap, i.e., the exhaust between member 30 and member 26 of FIG. 7.
[2]This is the hydrocarbon content in the exhaust discharged from the catalyzed trap, i.e., discharged from tail pipe 32 of FIG. 7.

Figure 4:
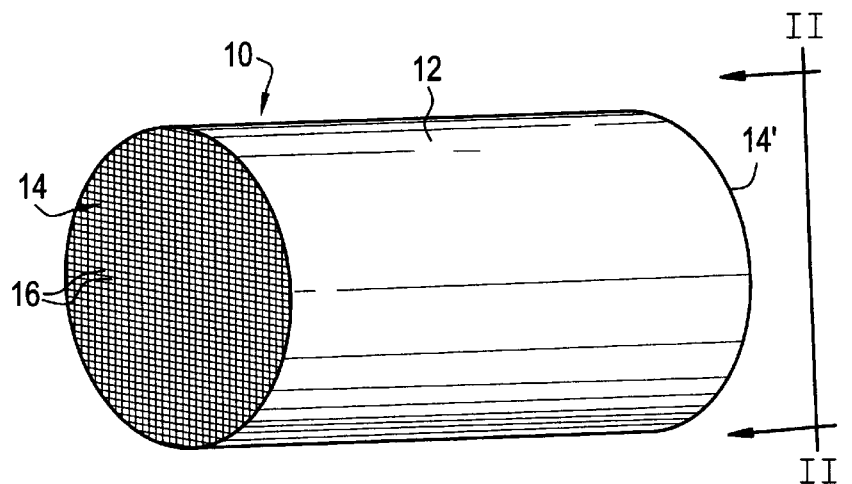
FIG. 4 is a schematic perspective view of a catalyzed hydrocarbon trap member in accordance with one embodiment of the present invention.
Figure 6:
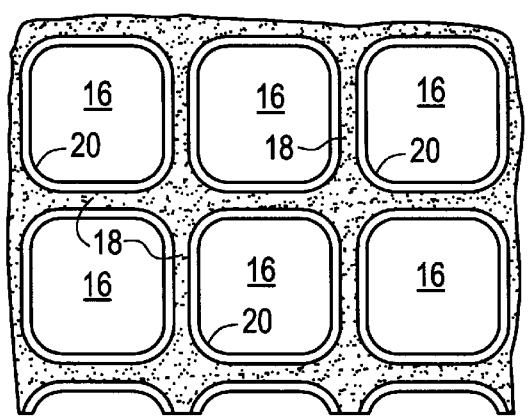
FIG. 6 is a schematic end view in elevation, greatly enlarged relative to FIGS. 4 and 5, of several of the gas flow channels of the member of FIG. 4.
Figure 5:
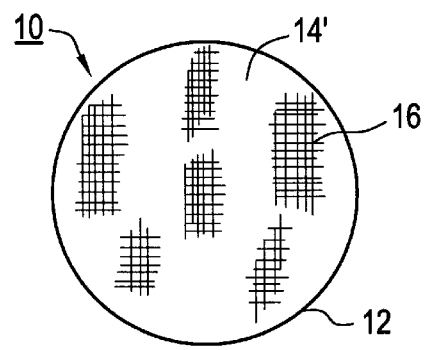
FIG. 5 is an end view in elevation taken along line II—II of FIG. 4.

The data of the table of this Part C show the effectiveness of the catalyzed trap and the dramatic improvement in tail pipe (32 in FIG. 7) hydrocarbons emitted from the trap member ("Tail Pipe Out HC") at column B of the table as compared to the effluent from the TWC catalyst ("TWC Out HC") of column A of the table for all three Bags of the U.S. FTP. Column C of the table shows the difference between columns A and B and represents the reduction in hydrocarbon emissions effectuated by the catalyzed hydrocarbon trap FIG. 4 shows a catalyzed hydrocarbon trap member 10 having an outer surface 12 and a plurality of fine, parallel gas flow channels 16 extending from and through inlet face 14 to and through outlet face 14' (FIG. 5). As seen in FIG. 6, the gas flow channels 16 are defined by a plurality of walls 18 which have on the surfaces thereof defining the channels 16 a thin, dried and calcined washcoat 20 comprising the catalyzed hydrocarbon trap material of the present invention. Washcoat 20 is thus comprised of a silver-containing zeolite, e.g., ZSM-5 and/or Beta, also containing some palladium, plus palladium and some silver dispersed on a high surface area support, e.g., gamma alumina. In use, the catalyzed trap member 10 is placed within a suitable container, usually stainless steel, and interposed in the exhaust line of an internal combustion engine in a manner well known to those skilled in the art, so that the exhaust flows through the channels 16 from inlet face 14 to outlet face 14' of trap member 10.

FIG. 7 schematically shows a typical use environment of member 10 wherein an internal combustion engine such as the illustrated gasoline-fueled engine 22 has an exhaust pipe 24 in which a treatment catalyst member 28 is connected for flow of the exhaust of engine 22 therethrough. Catalyst member 28 may comprise any known or suitable oxidation or three-way conversion catalyst comprising a catalytic washcoat dispersed on a monolith similar to that of trap member 10. Thus, the catalytic material of catalyst member 28 is coated onto the walls defining the gas flow passages of catalyst member 28, which is encased within a stainless steel canister 30 in the known manner. The exhaust discharged from catalyst member 28 flows through the next section of exhaust pipe 24 to trap member 10, which, like catalyst member 28, is contained within a stainless steel canister 26 interposed in the flow path of exhaust pipe 24. A source of additional oxygen is provided to trap member 10 by injecting air via an air pump 34 and line 36 into exhaust pipe 24 between catalyst member 28 and trap member 10. The additional oxygen (air) is added in an amount sufficient to insure oxidation of the hydrocarbons desorbed from trap member 10, the oxidation being catalyzed by the palladium oxidation catalyst component of trap member 10. The exhaust flows through the gas flow channels 16 (FIGS. 4, 5 and 6) of trap member 10 in contact with washcoat 20 (FIG. 6) for treatment as described above. The exhaust discharged from trap member 10 is discharged to the atmosphere via tail pipe 32.

While the invention has been described with reference to particular embodiments thereof, it will be appreciated that upon a reading and understanding of the foregoing, alterations to the disclosed embodiments will occur to those skilled in the art and it is intended to include all such alterations within the scope of the appended claims.

What is claimed is:

1. A catalyzed hydrocarbon trap material comprising a mixture of (1) a particulate refractory inorganic oxide support having dispersed thereon a silver component and a catalytically effective amount of a palladium component, and (2) a particulate zeolite having a Si to Al atomic ratio of at least 10 and a pore aperture diameter of at least 4 Angstroms, the zeolite having dispersed thereon a silver component and a palladium component, the catalyzed hydrocarbon trap material being made by a process of
 a) combining (i) water, (ii) a water-soluble silver component, (iii) a water-soluble palladium component, (iv) particulate refractory inorganic oxide solids, and (v) particulate zeolite solids to form an aqueous slurry of the solids;
 b) maintaining the resulting slurry for a time sufficient to disperse at least some of the palladium component and at least some of the silver component onto each of the inorganic oxide solids and the zeolite solids; and
 c) dewatering the slurry to provide dewatered solids and heating the dewatered solids to provide the catalyzed hydrocarbon trap material as a dried mixture of solids.

2. The material of claim 1 wherein the zeolite is selected from the group consisting of ZSM-5, Beta, Y, MCM-22, EU-1 zeolites and mixtures thereof.

3. The material of claim 2 wherein the zeolite other than Y zeolite has a Si to Al atomic ratio of from about 10 to 300 and when the zeolite is Y zeolite it has a Si to Al atomic ratio of from about 10 to 20.

4. The material of claim 3 wherein the zeolite other than Y zeolite has a Si to Al atomic ratio of from about 10 to 150.

5. The material of claim 2 wherein the zeolite is selected from the group consisting of ZSM-5, Beta, Y zeolites and mixtures thereof.

6. The material of claim 1 wherein the zeolite comprises ZSM-5 and, optionally, at least one zeolite selected from the group consisting of Beta, Y, MCM-22 and EU-1 zeolites.

7. The material of any one of claims 1 through 6 coated onto channel walls of a refractory substrate having an inlet face and an outlet face and a plurality of substantially parallel flow passages defined by the channel walls and extending through and from the inlet face to and through the outlet face.

8. The material of claim 7 wherein the loading of the palladium component, calculated as Pd, on the inorganic oxide is from about 2 to 20 weight percent and the loading of the silver component, calculated as Ag, on the zeolite is from about 2 to 15 percent.

9. The material of any one of claims 1 through 6 wherein the weight ratio of (dry basis) inorganic metal oxide to zeolite, on a metals-free basis, is from about 1:5 to 5:1, and the loading of the palladium component, calculated as Pd, on the inorganic oxide is from about 2 to 20 weight percent and the loading of the silver component, calculated as Ag, on the zeolite is, from about 2 to 15 weight percent.

10. A catalyzed hydrocarbon trap material comprising a mixture of (1) a particulate refractory inorganic oxide support having dispersed thereon a silver component and a catalytically effective amount of a palladium component, and (2) a particulate zeolite having a Si to Al atomic ratio of at least 10 and a pore aperture diameter of at least 4 Angstroms, the zeolite having dispersed thereon a silver component and a palladium component.

11. The material of claim 10 wherein the zeolite is selected from the group consisting of ZSM-5, Beta, Y, MCM-22, EU-1 zeolites and mixtures thereof.

12. The material of claim 11 wherein the zeolite other than Y zeolite has a Si to Al atomic ratio of from about 10 to 300 and when the zeolite is Y zeolite it has a Si to Al atomic ratio of from about 10 to 20.

13. The material of claim 12 wherein the zeolite other than Y zeolite has a Si to Al atomic ratio of from about 10 to 150.

14. The material of claim 10 wherein the zeolite is selected from the group consisting of ZSM-5, Beta, Y zeolites and mixtures thereof.

15. The material of claim 10 wherein the zeolite comprises ZSM-5 and, optionally, at least one zeolite selected from the group consisting of Beta, Y, MCM-22 and EU-1 zeolites.

16. The material of any one of claims 10 through 15 coated onto channel walls of a refractory substrate having an inlet face and an outlet face and a plurality of substantially parallel flow passages defined by the channel walls and extending through and from the inlet face to and through the outlet face.

17. The material of claim 16 wherein the loading of the palladium component, calculated as Pd, on the inorganic oxide is from about 2 to 20 weight percent and the loading of the silver component, calculated as Ag, on the zeolite is from about 2 to 15 percent.

18. The material of any one of claims 10 through 15 wherein the weight ratio of (dry basis) inorganic metal oxide to zeolite, on a metals-free basis, is from about 1:5 to 5:1, and the loading of the palladium component, calculated as Pd, on the inorganic oxide is from about 2 to 20 weight percent and the loading of the silver component, calculated as Ag, on the zeolite is from about 2 to 15 weight percent.

* * * * *